United States Patent [19]

Kuwajima

[11] Patent Number: 4,595,961
[45] Date of Patent: Jun. 17, 1986

[54] HELICAL SCAN TYPE TAPE RECORDING REPRODUCING APPARATUS HAVING A PART-CYLINDRICAL DRUM

[75] Inventor: Hideki Kuwajima, Osaka, Japan

[73] Assignee: Matsushita Electric Industrial Co., Ltd., Osaka, Japan

[21] Appl. No.: 563,740

[22] Filed: Dec. 21, 1983

[30] Foreign Application Priority Data

| Dec. 21, 1982 | [JP] | Japan | 57-225333 |
| Mar. 30, 1983 | [JP] | Japan | 58-55586 |
| Mar. 30, 1983 | [JP] | Japan | 58-55587 |
| Mar. 30, 1983 | [JP] | Japan | 58-55588 |
| Jun. 6, 1983 | [JP] | Japan | 58-101183 |

[51] Int. Cl.⁴ .......................... G11B 15/66; G11B 5/08
[52] U.S. Cl. ........................................ 360/85; 360/95; 360/130.24
[58] Field of Search ............... 360/85, 95, 130.24, 360/84, 93, 130.21-130.23

[56] References Cited

U.S. PATENT DOCUMENTS

| 3,979,772 | 9/1976 | Umeda | 360/85 |
| 4,025,959 | 5/1977 | Warren | 360/85 |
| 4,369,473 | 1/1983 | Eibensteiner | 360/85 |

*Primary Examiner*—John H. Wolff
*Assistant Examiner*—David J. Severin
*Attorney, Agent, or Firm*—Pollock, Vande Sande & Priddy

[57] ABSTRACT

A helical scan type tape recording reproducing apparatus comprises a drum assembly on which a tape is obliquely wound. The drum assembly includes coaxially mounted, vertically spaced apart drums, wherein at least the upper drum is truncated along a vertical flat plane into the shape of a part-cylindrical form. The arrangement is such that when the apparatus is in a standby condition the straight edge side of the part-cylindrical drum is positioned in close proximity to and in parallel with a section of a cassette tape that extends through a recess formed in the cassette and when the apparatus is activated the part-cylindrical drum is rotated 180° turn so that it partially enters the recess of the cassette.

8 Claims, 20 Drawing Figures

HELICAL SCAN TYPE TAPE RECORDING REPRODUCING APPARATUS HAVING A PART-CYLINDRICAL DRUM

BACKGROUND OF THE INVENTION

The present invention relates to a helical scan type magnetic tape recording reproducing apparatus wherein magnetic heads are arranged to rotate between coaxially mounted upper and lower drums.

Figure 1:
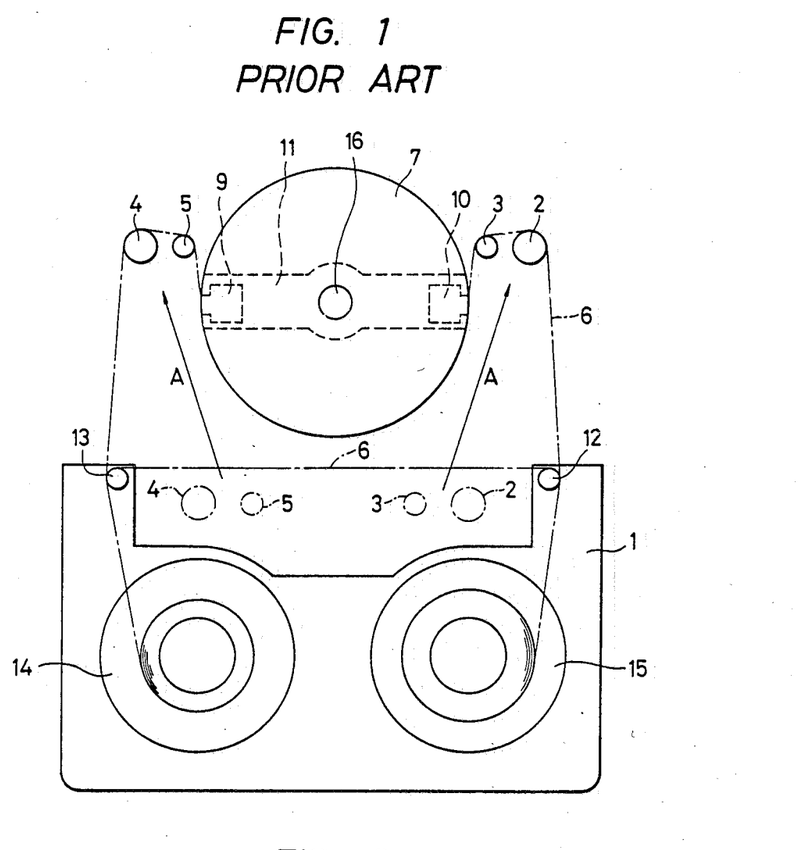
FIGS. 1 and 2 are illustrations of the magnetic tape recording mechanism of a conventional video tape recorder.
Figure 2:
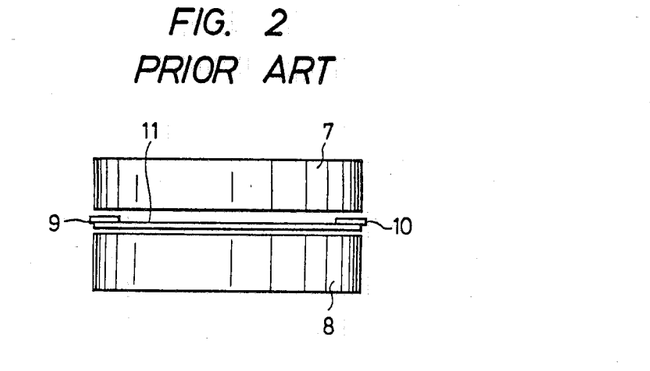

Conventional magnetic recording reproducing apparatus comprise a pair of coaxially mounted, identical full-cylindrical drums which are vertically spaced apart to rotatably mount therebetween a rotary yoke carrying a transducer head at each end thereof. This yoke is rotated at high speeds to provide recording of signals on a magnetic tape wound on the drums obliquely with respect to the axis of rotation of the yoke. In a prior art apparatus, shown in FIGS. 1 and 2, a tape loading arrangement including a roller post 2, and inclined post 3, a roller post 4 and an inclined post 5 is moved to pull out magnetic tape 6 from a cassette 1 in the direction of an arrow A and wind it on the upper and lower drums 7 and 8, and then a rotary yoke 11 having heads 9 and 10 is rotated for recording a signal on and reproducing it from the magnetic tape 6.

It has recently become necessary to minimize the size of the apparatus as small as possible so that it can be even more easily carried and compactly stored. In video tape recording, the compactness of the apparatus is of particular advantage if it can be combined with a video camera. However, the prior art structure of drum assembly is not suitable for this purpose since the assembly occupies a substantial amount of space and weight.

SUMMARY OF THE INVENTION

Therefore, an object of the present invention is to provide a helical scan type tape recording reproducing apparatus which is compact and light-weight.

To allow compact design of helical scan type magnetic recording reproducing apparatus, the present invention contemplates to provide a drum assembly having coaxially mounted upper and lower drums at least the upper drum is truncated along a vertical plane into the shape of a part-cylindrical form. The arrangement is such that when the apparatus is in a standby condition the truncated edge of the part-cylindical upper drum is positioned in close proximity to and in parallel with a section of a cassette tape that extends through a recess formed in the cassette and when the tape is loaded onto the drums the drums are rotated through a predetermined angle into an operating position and the part-cylindrical drum partially enters the recess of the cassette.

Another object of the present invention is to simplify the tape loading mechanism of a helical scan type recording reproducing apparatus.

A further object of the present invention is to utilize a single motor for driving the drum assembly and the tape loading mechanism in combination with a differential gear assembly which selectively transmit drive power from the motor to the driven mechanisms.

DETAILED DESCRIPTION

In the drawings like parts are indicated by like numerals throughout.

Figure 3:
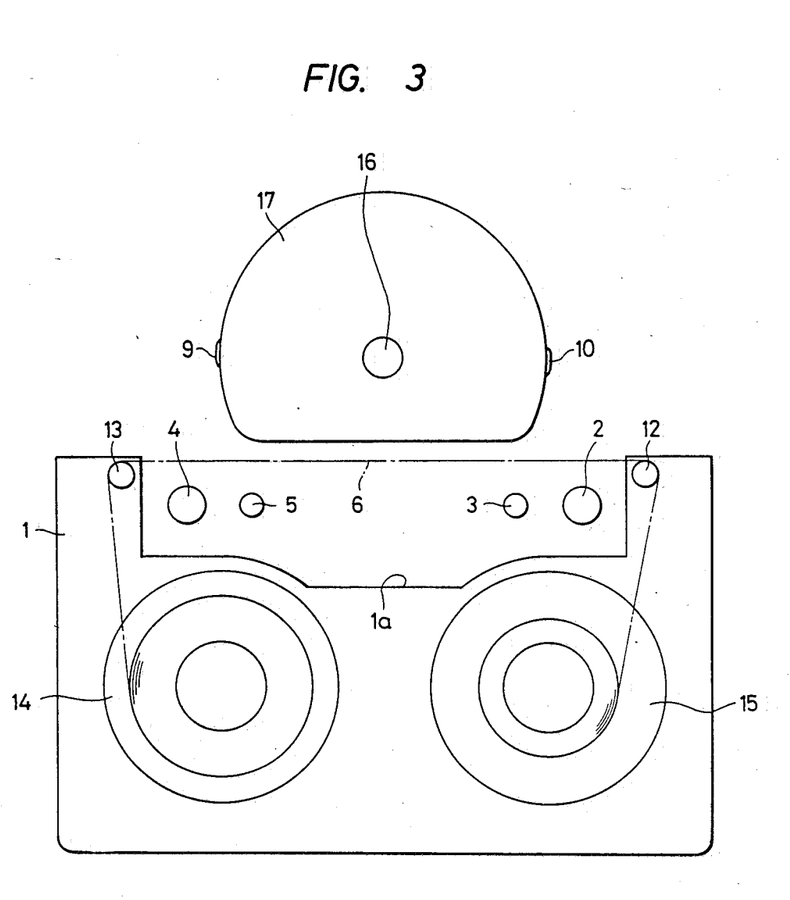
FIG. 3 is a plan view of a tape loading mechanism according to a first embodiment of the invention illustrating a tape cassette being in a standby state.
Figure 4A:
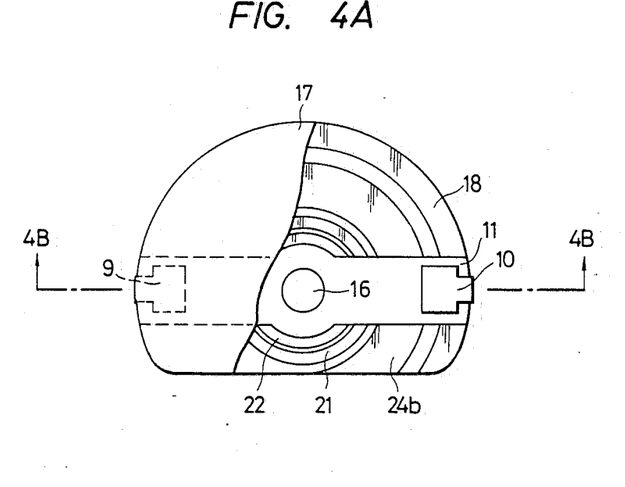
FIG. 4A is a plan view of the part-cylindrical drums of FIG. 3 with the upper drum being partially broken to reveal the internal structure.
Figure 4B:
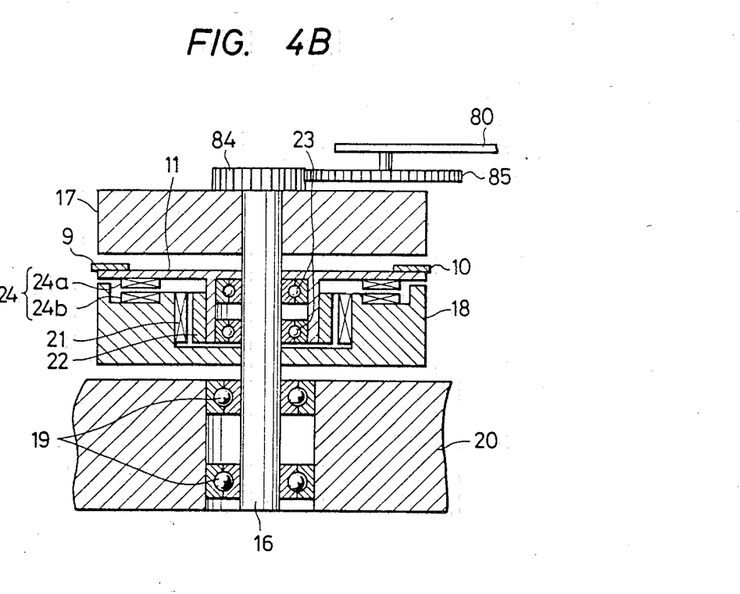
FIG. 4B is a cross-sectional view of the drums taken along the line 4B—4B of FIG. 4A.

Referring to FIGS. 3, 4A and 4B, there is shown a drum assembly of a first embodiment of the present invention in which upper and lower drums 17 and 18 are in the shape of part-cylinders which are truncated along a vertical flat plane so that their horizontal cross-section is defined by a straight edge and an arc having an arcuate extent somewhat greater than 180 degrees. Between the drums 17 and 18 is a rotary yoke 11 carrying transducer heads 9 and 10 at opposite ends thereof as in the prior art apparatus. The upper and lower drums are spline-connected to a vertical shaft 16 in alignment with each other. The shaft 16 is supported rotatably by a lower chassis 20 by way of bearings 19, and is rotatable by a drive mechanism which will be described later by way of spur gears 84 and 85 rotatably secured to an upper chassis 80. The rotary yoke 11 is rotatably mounted on the shaft 16 by means of bearings 23 and driven by a mechanism comprising a coil 21 of part-cylindrical form secured to the lower drum 18 and a permanent magnet 22 attached to the hub portion of the yoke 11. The coil 21 is energized by a well known control circuit not shown to generate flux that causes the yoke to rotate at the necessary speed. Alternatively, an external drive source may be employed to rotate the yoke 11 instead of the coil 21 and magnet 22. Primary windings 24a of a rotary transformer 24 are attached to the lower side of the yoke 11 adjacent the transducer heads and a secondary winding 24b of the transformer is secured to the upper surface of the lower part-cylindrical drum 18 for inductively coupling the transducer heads 9 and 10 to external circuitry.

As shown in FIG. 3, the cassette 1 has a recess 1a to provide a space in which the tape loading guide including roller posts 2, 4 and inclined posts 3, 5 are accommodated and in which a section of the tape normally extends linearly from roller posts 12 to 13 of the cassette to engage with the loading guide when the tape is wound onto the drums. The truncated drums 17 and 18 are positioned so that when the apparatus is in a standby condition their vertical flat planes are in close proximity to and parallel with the exposed section of the tape 6. Therefore, when a cassette is manually loaded into the apparatus, the drums 17 and 18 are in the position of FIG. 3 and the exposed portion of the tape 6 comes in between the loading guides 2-5 and the vertical edges of the truncated drums 17 and 18.

Figure 5:
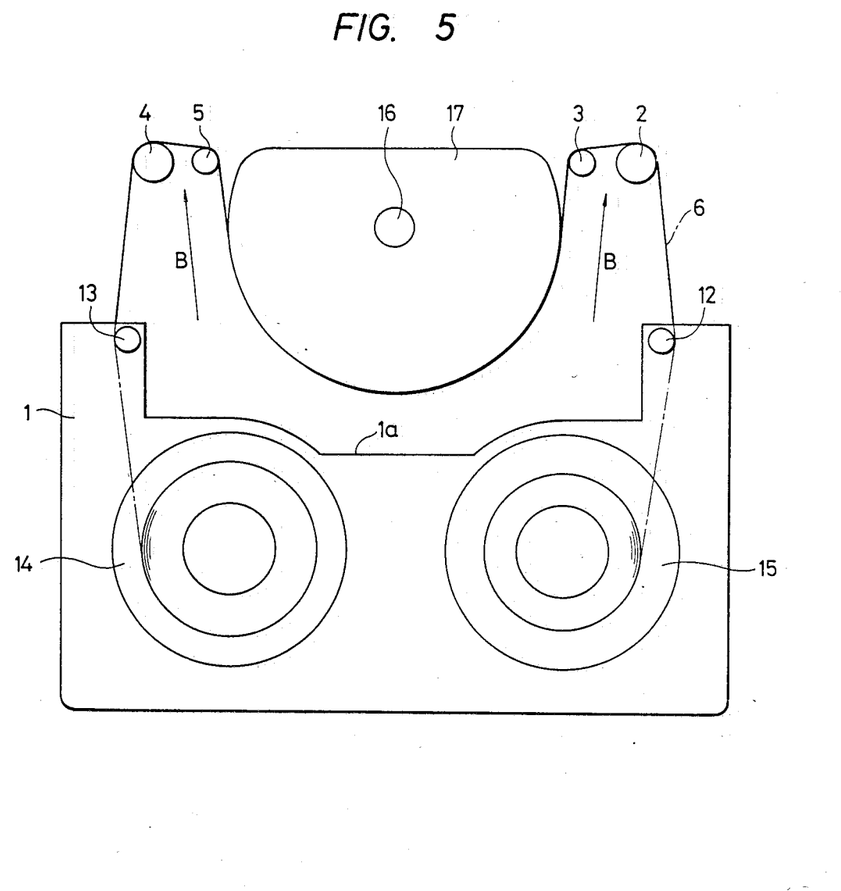
FIG. 5 is a plan view of the first embodiment showing a tape being loaded onto the drums.

As shown in FIG. 5, the tape loading guide is moved in the direction of arrow B to engage the tape and load it onto the drums 17, 18 around their circumference. Simultaneously with the movement of the tape loading guide, the upper and lower drums 17 and 18 are rotated by a mechanism to be described later to an operating position which is 180 degrees displaced from the standby position by way of gears 84 and 85 and held in that position during operation. In this operating position, the portions of the drums diametrically opposite to the truncated edges enter the recess 1a of the cassette and the head carrying yoke 11 is rotated at high speed in a known manner while contacting the tape 6 along a path skewed relative to its length.

With this arrangement the distance between the rotary shaft 16 and the cassette 1 is reduced by an amount equal to the truncated portion of the drums 17, 18. The drums 17, 18 and the cassette 1 can thus be compactly accommodated within an area smaller than is required by the prior art arrangement of FIG. 1. The tape loading mechanism of the invention thus keeps the tape recording apparatus compact and light-weight.

According to an interesting feature of the invention, the tape loading guide can be significantly simplified if the recording signal is a digital signal derived from a circuit in which the analog source signal is digitized into a frame format and time-compressed. Because of the time compression it is only necessary to wind the tape over a smaller section of the drums than is required to record the original signal.

Figure 6:
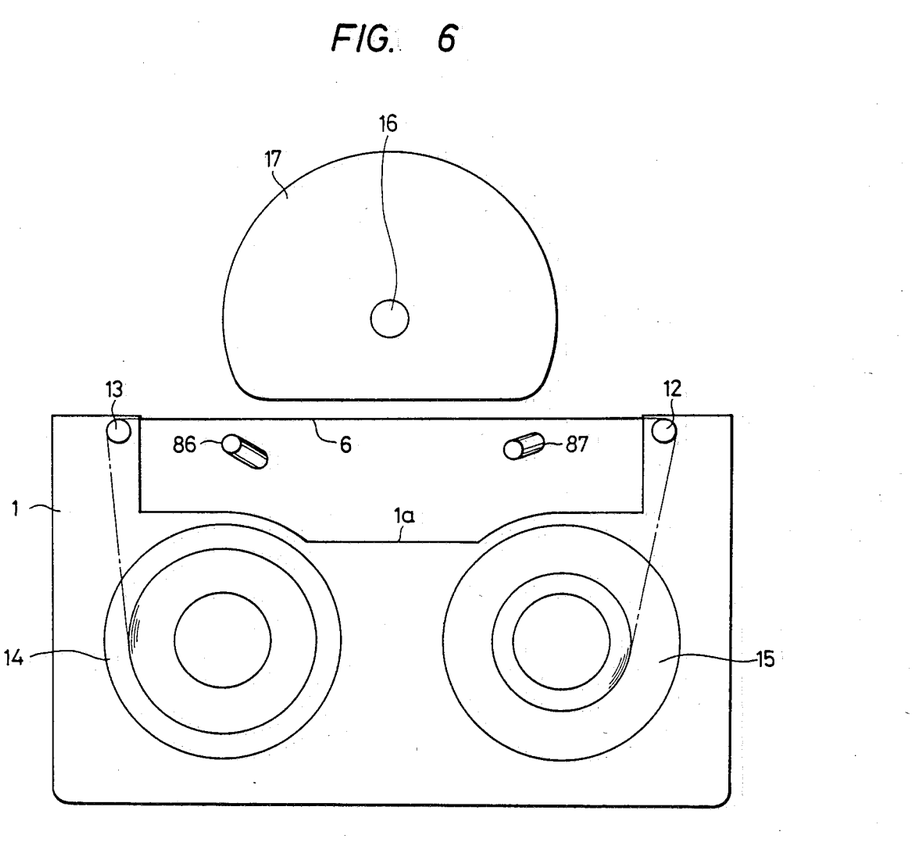
FIGS. 6 and 7 are illustrations of a modification of the first embodiment.
Figure 7:
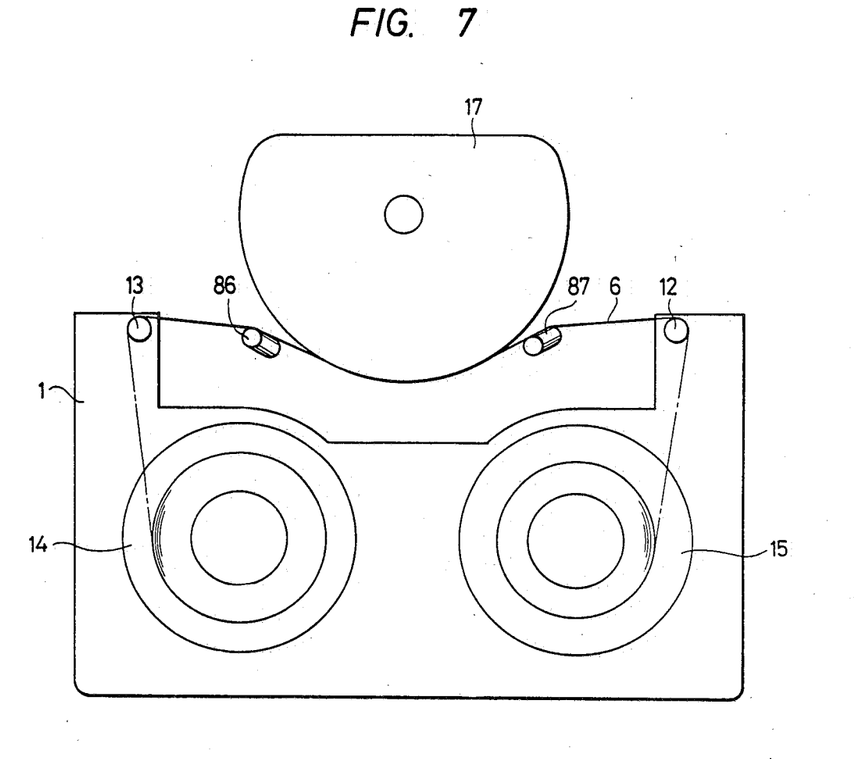

FIG. 6 illustrates the simplified tape guide with the part-cylindrical drums 17, 18 being in a standby position. The tape guide comprises a pair of inclined stationary guide posts 86 and 87 located in the recess 1a of the cassette. A complicated moving mechanism is not required. When the upper and lower drums are rotated half turn, the portion of the circumferential walls of the drums which is considered sufficient to record a complete frame of the time-compressed signal comes into contact with tape 6 as shown in FIG. 7. The stationary guides 86 and 87 are so inclined that the drum contact portion of the tape is part-helically wound on the drums.

Figure 8:
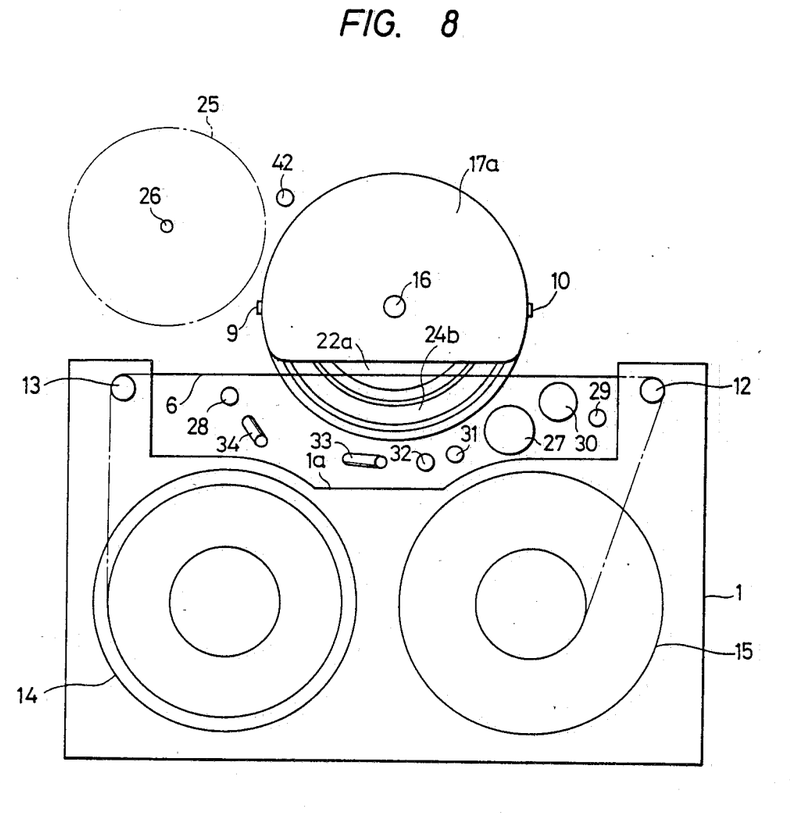
FIG. 8 is a plan view of a second embodiment of the present invention.

FIGS. 8 to 12 show a second embodiment of the present invention. In FIG. 8 it is shown that only the upper drum 17a is truncated into a part-cylindrical form and is positioned so that its truncated straight edge is normally in close proximity to and parallel with a section of the tape 6. The lower drum is of the cylindrical shape having a ring-shaped driving coil 22a and a ring-shaped secondary winding 24b of the rotary transformer 24, encircled by dotted line, and partially extends into the recess 1a of the cassette below the exposed portion of the tape 6.

Figure 9A:
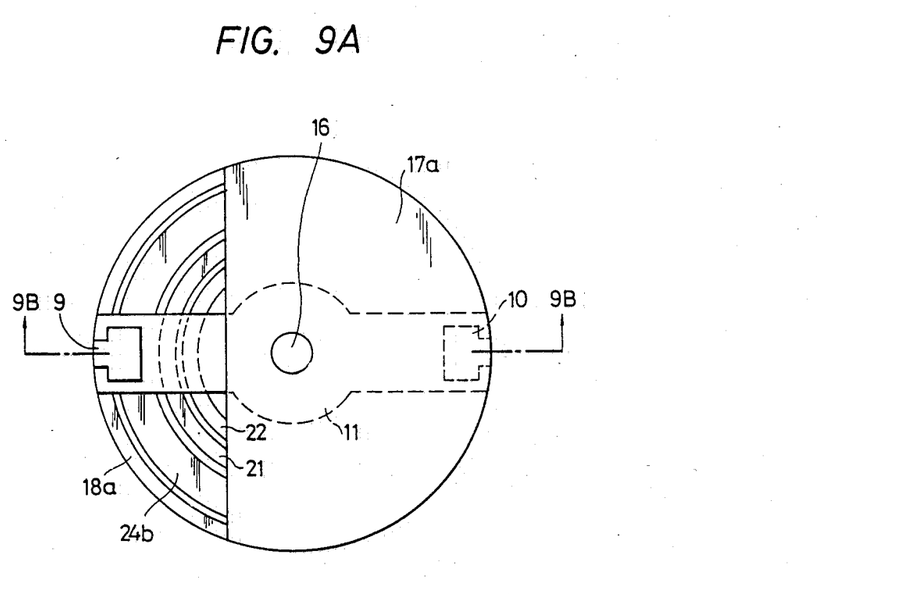
FIG. 9A is a plan view of the drums of the second embodiment.
Figure 9B:
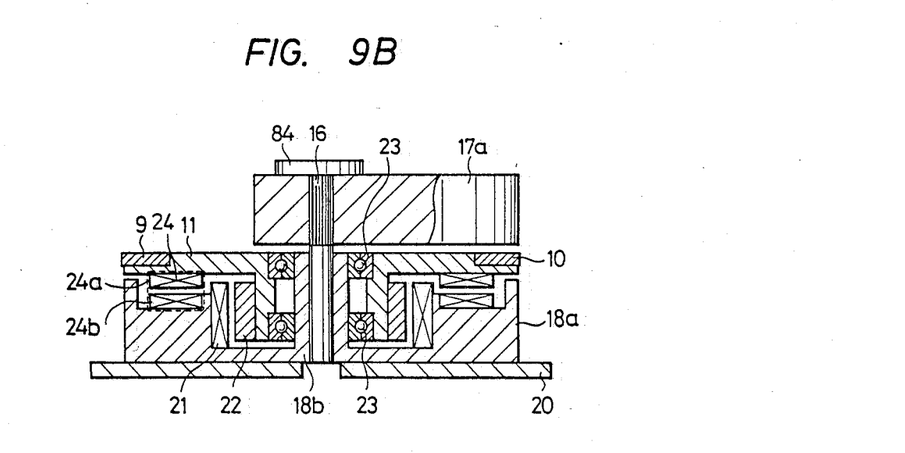
FIG. 9B is a cross-sectional view taken along the line 9B—9B of FIG. 9A.

As shown in FIGS. 9A and 9B, the lower full-cylindrical drum 18a is firmly secured to the chassis 20 and the upper part-cylindrical drum 17a is spline-connected to the rotary shaft 16 which is in turn journalled through a hub portion 18b of the lower drum so that it rotates with respect to the lower drum 18a through an angle of substantially 90 degrees. Illustrated at 25 by a chain-dot line is a capstan motor having a capstan 26 which is engageable with a pinch roller 27 with the tape 6 therebetween. Numerals 28-32 denote tape loading rollers and numerals 33 and 34 represent inclined tape loading posts all of which form the tape loading guide and are normally located in the recess 1a of the cassette 1 as in the first embodiment. The pinch roller 27 is also normally located in the recess 1a and forms part of the tape loading guide.

Figure 10:
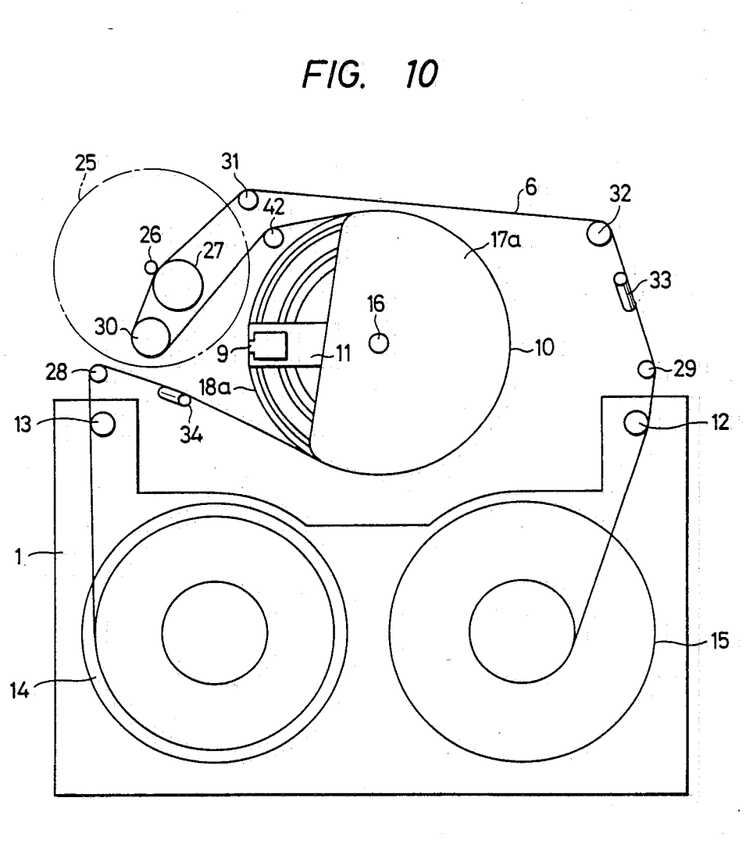
FIG. 10 is a plan view of the apparatus of the second embodiment with the tape being loaded onto the drums.

The upper drum 17a is initially rotated by almost 90 degrees to the operating position as illustrated in FIG. 10 by a first loading motor, not shown. Subsequently, a second loading motor, also not shown, is energized to move the tape loading guide in a well known manner to the operating position of FIG. 10 to draw the tape 6 out of the cassette 1 and wind it on the circumference of the upper and lower drums.

Figure 11:
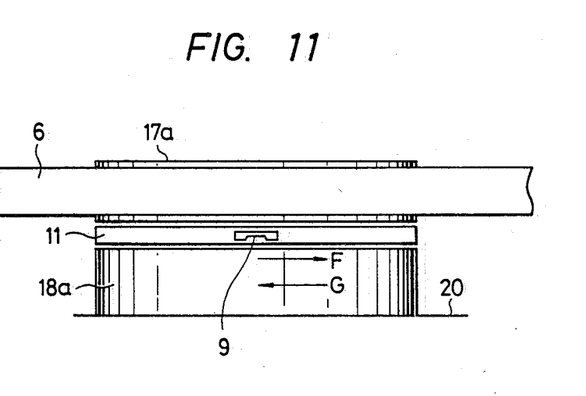
FIG. 11 is a front view of the drums of the second embodiment in a standby position.
Figure 12:
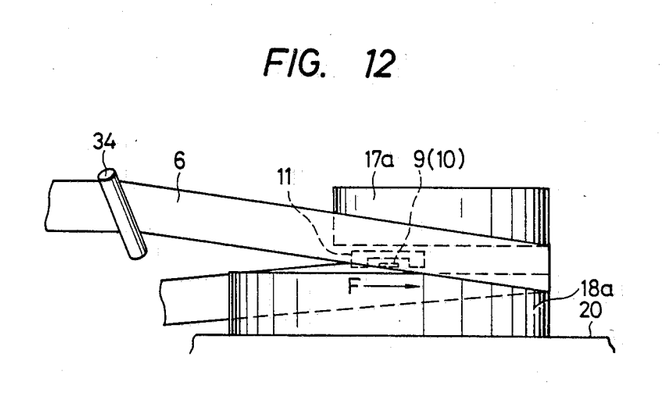
FIG. 12 is a side view of the drums of the second embodiment with the tape being loaded onto the drums.

Prior to tape loading operation the exposed portion of tape 6 is located at a position above the rotary yoke 11 as shown in FIG. 11. As the tape is reeled off the cassette 1 during loading, the rotary yoke 11 is rotated in the direction of an arrow G reverse to the direction of an arrow F in which it rotates during recording and playback modes so that the transducer heads move substantially at the same speed as the tape to prevent damage on the tape which might otherwise occur when the tape's lower edge makes contact with one of the heads as the tape is being wound at an angle to the horizontal on the drums as shown in FIG. 12.

A feature of the second embodiment is that it allows the use of a conventional structure for the lower cylindrical drum. It is to be noted that the simplified stationary tape guide of FIG. 6 could equally be as well employed in the second embodiment.

Figure 13:
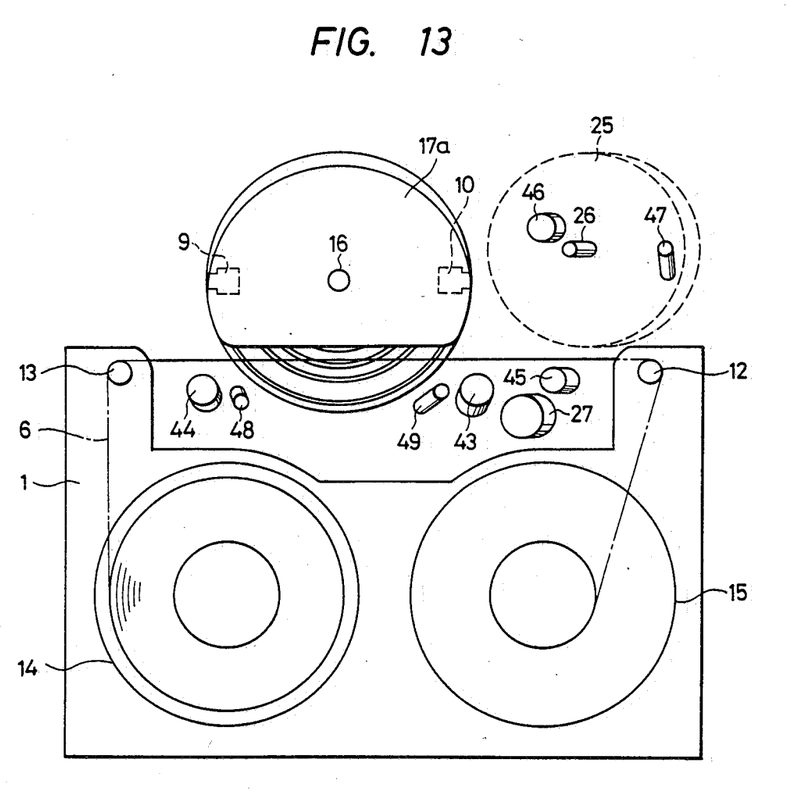
FIGS. 13 and 14 are illustrations of a third embodiment of the present invention.
Figure 14:
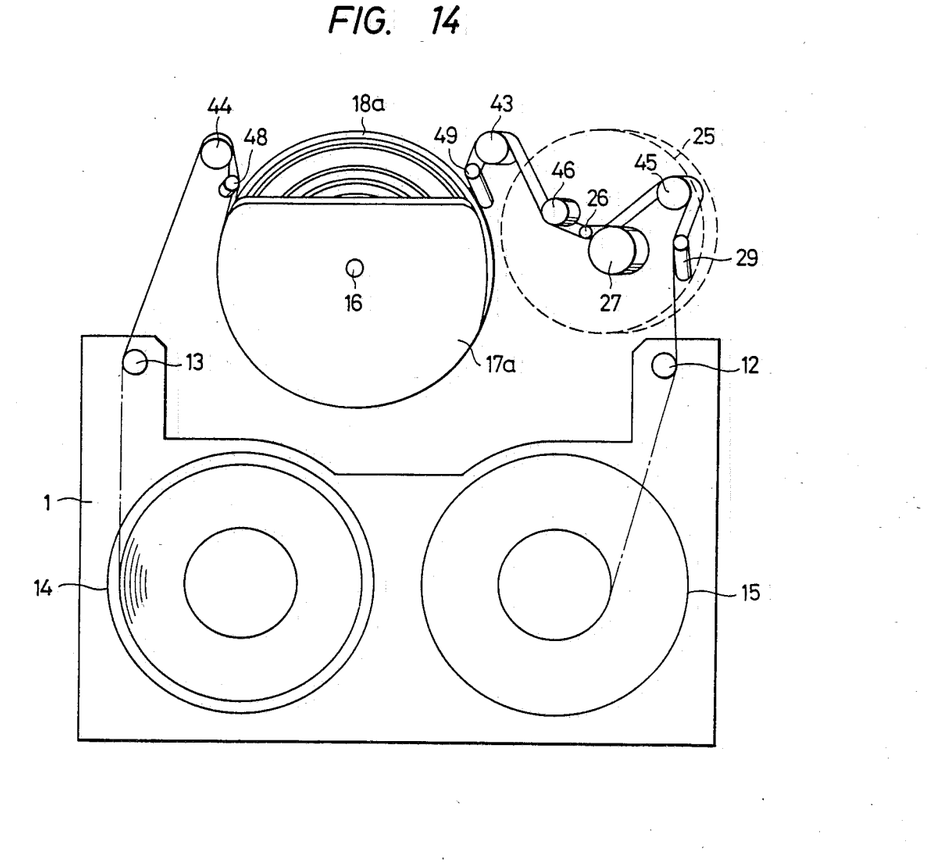
Figure 15:
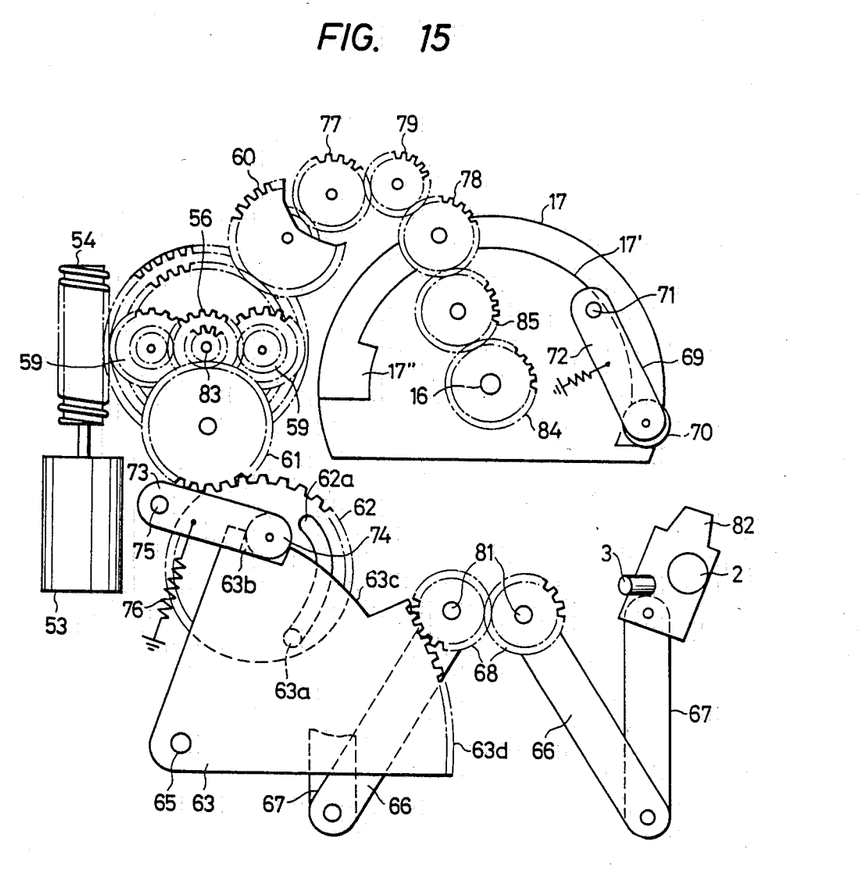
FIGS. 15-18 are illustrations of a cylinder and tape drive mechanism to be used in conjunction with the first embodiment of the invention.

FIGS. 13 and 14 are illustrations of a third embodiment of the present invention which differs from the second embodiment in that the tape loading guide is arranged to load the tape in the shape of the letter M and that the drum assembly is tilted vertically toward the cassette 1 to decrease the tension exerted upon the portion of the tape between the drum assembly and the takeup reel 14. The upper truncated drum 17a is rotated and turned 180° immediately before the tape is paid off the cassette. The tape traverses through different guides, indicated by numerals 43, 44, 45, 48, 49, 27, and is subsequently moved to load the tape on the circumference of the upper and lower drums. As the tape guide is moving, the rotary yoke 11 is rotated in the same manner as the second embodiment to prevent damage on the tape.

The following description relates to the detail of the drive mechanism used for driving the drum assembly and tape guide posts of the first embodiment of the present invention. This mechanism comprises a cylinder drive submechanism for rotating the drums 17, 18 and a tape drive submechanism for loading the tape onto the drums 17, 18.

Figure 18:
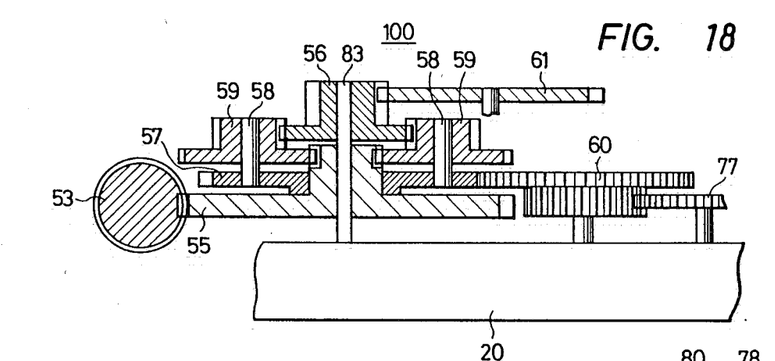

In FIGS. 15 to 18, the cylinder drive submechanism includes a motor 53 having a worm gear 54 and a differential gear assembly 100. The differential gear assembly 100 comprises a common shaft 83 secured to the chassis 20, a worm gear 55 which is in mesh with the drive gear 54 at the lower toothed portion. The worm gear 55 is further in mesh at the upper toothed portion thereof with the lower toothed portions of a pair of planetary gears 59 as best seen in FIG. 18. The upper toothed portions of the planetary gears 59 are in mesh with the lower toothed portion of a sun gear 56 which is rotatably mounted on the shaft 83. The planetary gears 59 are rotatably mounted on respective shafts 58 which are firmly secured to a free wheel 57 which is freely rotatably mounted on the worm gear 55 in mesh with a spur gear 60 which forms part of the cylinder drive submechanism.

The wheel 60 is in mesh with a gear 77 whose rotation is transmitted by a gear assembly having a pair of gears 79 vertically spaced apart on a shaft 79a to the rotary shaft 16 of the drums 17, 18 through a gear train comprising gears 78, 85 and 84. The cylinder drive submechanism includes a detent arm 69 which is pivoted at 71 and biased counterclockwise by a spring 72. A roller 70 is provided on the distal end of the arm 69 which is engaged with a cam groove 17' formed on the surface of the upper drum 17. A notch 17" is formed on the cam groove 17' to engage the roller 70 when the drums 17, 18 are rotated 180 degrees.

The tape loading submechanism includes a wheel 61 in mesh with the sun gear 56, the wheel 61 being in mesh a cam wheel 62 having a cam groove 62a. In the cam groove 62a is engaged a pin 63a of a sector wheel 63 which swivels on a pivot shaft 65 and is formed with a notch 63b which is in turn engageable with a roller 74 mounted on a detent arm 73 which is rotatably mounted on a shaft 75 and urged clockwise by means of a spring 76. The sector wheel 63 is formed with a non-toothed portion 63c engageable with the roller 74 and a toothed portion 63d in mesh with one of a pair of pinions 68 which are rotatably mounted on shafts 81 secured to the chassis, not shown. To the pinions 68 are firmly coupled articulated loading arms 66 and 67. For the sake of simplicity, one of the loading arms is shown connected to a base 82 on which are mounted the roller post 2 and inclined post 3 on the tape supply side of the apparatus.

Figure 16:
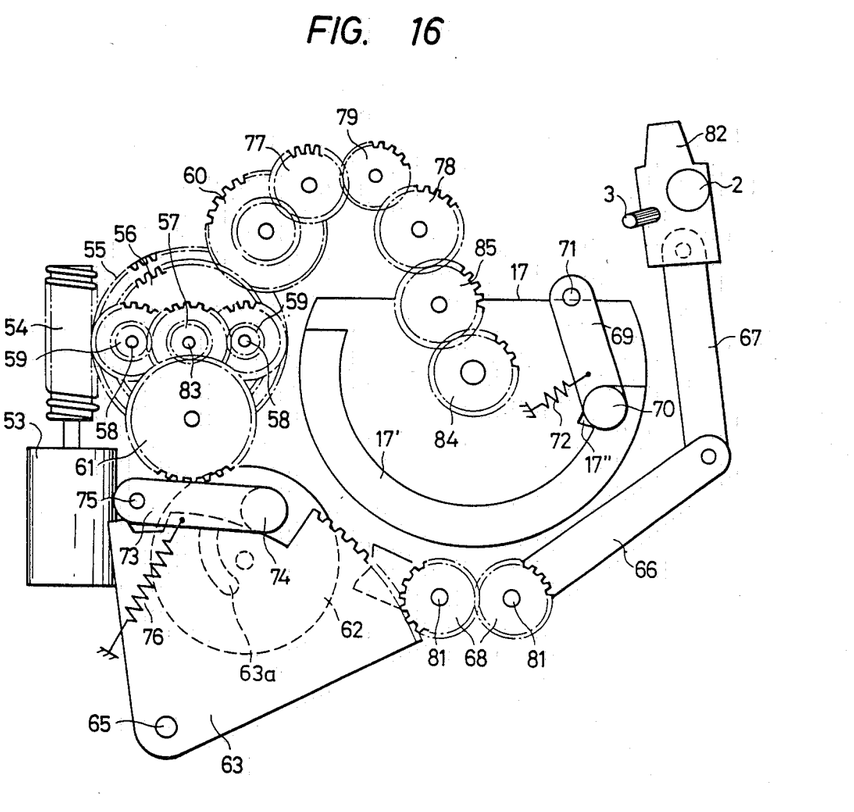
Figure 17:
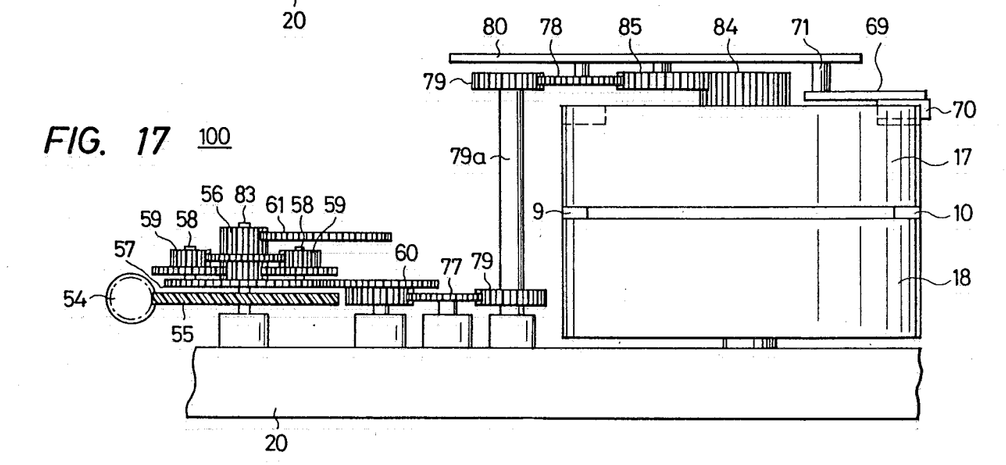

When the apparatus is switched to a tape loading operation, the motor 53 is energized to set the worm gear 55 in rotation. Initially, the roller 74 of the detent arm 73 is engaged with the notch 63 of the sector gear 63 to cause the gears 62 and 61 and the sun gear 56 to be locked. As a result, the planetary gears 59 rotate about the sun gear 56 causing the free wheel 57 to rotate about the shaft 83. The rotation of wheel 57 is transmitted by way of gears 60, 77, 79, 78, 85 and 84 to the drum assembly. Drums 17 and 18 are thus rotated clockwise until the roller 70 comes into engagement with the notch 17" as shown in FIG. 16. When the drums 17, 18 come to the position of FIG. 16 which is 180 degrees displaced from the starting position of FIG. 15, the rotation of free wheel 57 is stopped and the planetary gears 59 cease to rotate about the sun gear 56. The rotation of worm gear 57 is then transmitted to the rotation of the planetary gears 59 about their own shafts 58 in directions opposite to each other so that they cause the sun gear to rotate about shaft 83. The wheels 61 and 62 are therefore turned with a thrust sufficient to rotate the sector gear 63 counterclockwise to cause the roller 74 to disengage from the notch 63b and then engage the cam portion 63c. The rotation of sector gear 63 continues until the roller 74 comes into engagement with the termination of the cam portion 63c. Pinions 68 are turned in opposite directions to cause the loading arms 66 and 67 to move to their loading positions. As a result, the guide posts 2 and 3 come to a position proximate to the truncated edges of the drums 17, 18 as shown in FIG. 16. The motor 53 is automatically de-energized in response to the operation of a switch, not shown, which is activated when the tape loading operation is completed.

Tape unloading operation is initiated when the motor 53 is driven in the opposite direction. Since the roller 70 is engaged with the notch 17", the drums 17, 18 are held stationary and the rotation of worm gear 57 is transmitted to the sun gear 56 and thence to the gears 61, 62 and sector gear 63 so that the latter is turned clockwise to restore the loading arms to their original positions. The completion of the tape unloading operation locks the sun gear 56 and sets the planetary gears 59 into rotation about the sun gear, setting the free wheel 57 into rotation which is transmitted to the gear 84 to turn the drums counterclockwise with a thrust sufficient to disengage the roller 70 from the notch 17". When the drums are returned to the original position, a switch, not shown, is operated to deactivate the motor 53.

What is claimed is:

1. A tape recording reproducing apparatus of the helical scan type for use with a tape cassette, said cassette having a recess and means for supporting a section of magnetic tape across said recess, comprising:
    a drum assembly comprising a first drum and a second part-cylindrical drum coaxially mounted on a common axis with said first drum and axially spaced therefrom, said second drum being defined by a truncated flat portion and an arc portion which is aligned with the circumference of said first drum, said second drum being rotatable from a first angular position in which said truncated flat portion is in proximity to and in parallel with said section of tape to a second angular position in which said arc portion partially enters the area of said recess;
    a rotary yoke carrying a transducer head at each end thereof and coaxially rotating in the space between said drums so that each of the transducers moves along said arc portion;
    means for rotating said second drum from said first angular position to said second angular position after said cassette is loaded into said apparatus;
    tape loading guide posts located in said recess for loading said tape onto said drum assembly when said second drum enters the area of said recess so that the tape is wound along a part-helical path about said axis.

2. A tape recording reproducing apparatus as claimed in claim 1, wherein said first drum is in the shape of a part-cylindrical form identical to said second drum and axially aligned therewith, said first part-cylindrical drum being rotatably mounted on said common shaft for unitary rotation with said second drum from the first angular position to the second angular position.

3. A tape recording reproducing apparatus as claimed in claim 1, wherein said rotary yoke is located at a position below the lower edge of the tape of said section and is arranged to rotate so that said heads move with said tape when the latter is being loaded onto said drum assembly.

4. A tape recording reproducing apparatus as claimed in claim 1, wherein said second angular position is substantially displaced 180 degrees from said first angular position.

5. A tape recording reproducing apparatus as claimed in claim 1, wherein said tape loading guide posts are located stationarily within the area of said recess.

6. A tape recording reproducing apparatus as claimed in claim 1, wherein said common axis is tilted toward said cassette.

7. A tape recording reproducing apparatus as claimed in claim 1, wherein said tape loading guide posts are arranged to move from the area of said recess to operating positions, and wherein said rotating means comprises:
- a motor rotatable in a first direction when loading the tape onto said drum assembly and in a second direction when unloading said tape from said drum assembly;
- a differential gear assembly driven by said motor in opposite directions for delivering one of first and second output thrusts depending on the magnitudes of first and second input loads exerted thereupon in relation to each other;
- a first gear train connected to said differential gear assembly as said first input load for transmitting said first output thrust to said second drum to cause it to rotate from said first angular position to said second angular position when said motor rotates in the first direction and to cause said second drum to return to the first angular position when said motor rotates in the second direction; and
- a second gear train connected to said differential gear assembly as said second input load for transmitting said second output thrust to said tape loading guide posts to move the same to said operating positions when said motor rotates in the first direction and to cause the same to return to the original positions when said motor rotates in the second direction, the arrangement being such that when said motor is rotated in said first direction said first output thrust is delivered initially followed by the delivery of said second output thrust and when said motor is rotated in the second direction said second thrust is delivered initially followed by the delivery of said first output thrust.

8. A tape recording reproducing apparatus as claimed in claim 7, wherein said differential gear assembly comprises:
- a first gear mounted on a shaft and driven by said motor;
- a free wheel freely rotatably mounted on said shaft and coupled with said first gear train;
- a sun gear freely rotatably mounted on said shaft and coupled with said second gear train; and
- a pair of planetary gears rotatably mounted on said free wheel in mesh with said sun gear so that the planetary gears are rotatable with said free wheel about said sun gear when the sun gear is stationary and are rotatable about their own axes in opposite directions with said sun gear when the sun gear is allowed to rotate about said shaft.

* * * * *